(12) United States Patent
Boulot

(10) Patent No.: US 6,717,512 B2
(45) Date of Patent: Apr. 6, 2004

(54) METHOD AND DEVICE FOR VERIFYING THE COMPATIBILITY OF THE COMPONENTS OF A WHEEL

(75) Inventor: Jean-Francis Boulot, Pont du Chateau (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 10/351,794

(22) Filed: Jan. 27, 2003

(65) Prior Publication Data

US 2003/0156009 A1 Aug. 21, 2003

Related U.S. Application Data

(63) Continuation of application No. PCT/EP01/08641, filed on Jul. 26, 2001.

(30) Foreign Application Priority Data

Jul. 31, 2000 (FR) ............................................. 00 10288

(51) Int. Cl.$^7$ .......................... B60C 23/00; B60C 23/02
(52) U.S. Cl. ................. 340/442; 340/572.1; 340/572.8; 340/10.1; 340/10.42; 235/376; 700/115
(58) Field of Search .............................. 340/442, 572.1, 340/572.8, 5.1, 5.8, 10.1, 10.42, 679; 235/385, 376; 705/29; 700/110, 115

(56) References Cited

U.S. PATENT DOCUMENTS 5,109,213 A    4/1992  Williams ..................... 340/447
5,761,995 A  * 6/1998  Laiserin et al. ................ 101/32
6,317,026 B1 * 11/2001 Brodine ....................... 340/5.8

OTHER PUBLICATIONS

International Search Report, PCT/EP01/08461, OCt. 11, 2001.

* cited by examiner

Primary Examiner—Toan N Pham
(74) Attorney, Agent, or Firm—Martin Remick; Martin Farrell; Alan A. Csontos

(57) ABSTRACT

A method for verifying the compatibility of the components of a wheel, having the following steps of: identifying each of the components of the assembly by means of an electronic label; after mounting the assembly, verifying at least two of these labels by checking the mutual compatibility of the components corresponding to the identification elements received by a management unit; detecting any situation in which at least one of the components is incompatible with one or more of the other components, and generating a suitable signal in the event of incompatibility.

The invention also relates to a device for carrying out this method, this device comprising an identification element combined with each of the components of the assembly that it is desired to verify, a data transmission means, the management unit being capable of identifying any condition of incompatibility of at least one of the components of an assembly and of generating a signal in the event of a condition of incompatibility.

22 Claims, 5 Drawing Sheets

METHOD AND DEVICE FOR VERIFYING THE COMPATIBILITY OF THE COMPONENTS OF A WHEEL

CROSS-REFERENCE TO RELATED APPLICATIONS

This application is a continuation of International Application No. PCT/EP01/08641, filed 26 Jul. 2001, and further claims priority to French Application No. 00/10288, filed Jul. 31, 2000.

BACKGROUND

The present invention relates to a method for verifying the compatibility of the components of a wheel, especially a wheel that is capable of rolling temporarily under conditions of reduced pressure. The invention also relates to a device for carrying out this method. Motor vehicle constructors and tire manufacturers are attempting more and more to take account of the ever-increasing safety, comfort, and convenience demands of modern road users. This phenomenon is manifested, for example, by the commonplace occurrence of many types of device that were virtually nonexistent barely a few years ago, such as, for example, airbags, ABS brakes, ESP devices, etc. More particularly in the field of tires, it is seen that there is an increasingly wide range of products allowing extended mobility, that is to say the ability to continue rolling over a certain prescribed distance during a loss (partial or sometimes even total) of pressure in one or more tires. To allow rolling under conditions of loss of pressure, certain types of tire use reinforced sidewalls, which can withstand large flexures or deformations for an acceptable number of cycles.

Other types of arrangement involve the use of a safety support to support the interior of the tire tread during a loss of pressure. With this type of configuration, the insert plays a fundamental role in ensuring the correct functioning of the assembly. Therefore, the correct insert must be placed in the tire cavity during mounting. Although it is highly unlikely that an insert of inadequate size or of incorrect type will be inserted during the factory mounting of a newly mounted assembly, this type of situation can nevertheless arise (albeit exceptionally) during a subsequent disassembling of a mounted assembly, if a genuinely competent person does not perform the mounting. Such a person will systematically check the mutual compatibility of the various components of an assembly before the final mounting. In certain cases, this manual verification method may possibly prove to be insufficient.

SUMMARY OF THE INVENTION

The present invention is directed towards proposing a novel method and a suitable device for ensuring this type of verification. To do this, the invention proposes a method for automatically verifying the compatibility of the components of an assembly comprising a rim, a tire capable of being mounted on the rim and a safety support intended to at least partially support the tread of the tire under conditions of reduced pressure, the method having the following steps:

identifying each of the components of the assembly that it is desired to verify by means of automatically checkable identification elements;

after mounting the assembly, verifying at least two of these components by transmitting the corresponding identification elements to a data management unit;

checking the mutual compatibility of the components corresponding to the identification elements received by the management unit;

detecting any situation in which at least one of the components is incompatible with one or more of the other components;

generating a suitable signal in the event of an incompatibility.

Such a method makes it possible to ensure that the correct components are assembled together to constitute a mounted assembly. A strict respect of the technical requirements, for example as regards the capacity for rolling at reduced pressure, the autonomy achieved, etc., is thus targeted.

The transmission of the identification elements corresponding to each of the components to a data management unit is advantageously carried out by means of reading/interrogating the data corresponding to each component.

According to another embodiment, the identification elements corresponding to each of the components are transmitted to a data management unit by means of emitting the data corresponding to each component by an active label. They may be, for example, battery-powered transmitters, autonomous labels, etc. In this case, there is no interrogation, but rather transmission of the data (for example at regular intervals) from the labels to a receiver to which is connected the management unit. Advantageously, the identification elements are memorized in labels. According to one example, the labels are of electronic and electronically checkable type. The suitable signal in the event of an incompatibility is advantageously a warning that may be displayed on a display. Preferably, a suitable signal "OK" is emitted when all the compatibility conditions of the various components are satisfied. A suitable signal is advantageously emitted in the event of non-recognition of at least one of the components. In such a case, it is likely that this element will be unknown, that is to say that it is not included in the compatibility table as being able to be combined with another element.

According to another advantageous example, an appropriate signal is emitted during the non-detection of the support, or during the absence of support. By alerting the driver to correct the situation, a situation is avoided in which the extended mobility system would not be fully operational.

The compatibility is advantageously checked using a compatibility table. The compatibility table comprises, for example, data for all the components liable to be arranged on the same assembly. The compatibility table may preferably be updated. Thus, for example, during a servicing visit, the data in the management unit may be updated, to integrate the compatible products recently appearing on the market.

According to one advantageous example, the method comprises a simplified pre-test consisting of comparing the components detected at time T2 with those detected at time T1 where, for example, T1 and T2 correspond, respectively, to a first and a second powering up of the data management unit.

Advantageously, the method also comprises a measurement of the pressure in the tire cavity. This pressure measurement may be combined with a test relative to reference values. These reference values are established as a function of the detected configuration of the assembly and as a function of the temperature.

The method preferably involves verifying all of the components of all of the active wheels of the vehicle. The system may also be simplified by omitting the verification of a possible spare wheel not mounted for rolling.

The invention also involves a method for automatically verifying the compatibility of the components of an assembly comprising a rim and a tire capable of being mounted on the rim, the method having the following steps:

identifying each of the components of the assembly that it is desired to verify by means of automatically checkable identification elements;

mounting the assembly, and thereafter verifying at least two of these components by transmitting the corresponding identification elements to a data management unit;

checking the mutual compatibility of the components corresponding to the identification elements received by the management unit;

detecting any situation in which at least one of the components is incompatible with one or more of the other components;

generating a suitable signal in the event of an incompatibility.

Advantageously, the assembly also comprises a safety support intended at least partially to support the tread of the tire under conditions of reduced pressure.

Finally, the invention involves a device for verifying the compatibility of the elements of an assembly comprising a rim and a tire capable of being mounted on the rim, the device comprising:

an identification element combined with each of the components of the assembly that it is desired to verify;

a transmission means, capable of allowing the transmission of data between each of the components and a management unit, a management unit capable of:
identifying any condition of incompatibility of at least one of the components of an assembly;
generating a signal corresponding to the condition of incompatibility.

Advantageously, the assembly also comprises a safety support intended at least partially to support the tread of the tire under conditions of reduced pressure.

According to one advantageous example, each component comprises a label capable of containing the identification elements for the component. The labels are, for example, of electronic and electronically checkable type.

Preferably, the assembly comprises a pressure detector capable of measuring the pressure inside the tire cavity.

The transmission means may be of transponder type or alternatively of radio transmitter/receiver type. The transmission means preferably comprises one or more antennae.

DESCRIPTION OF THE FIGURES

Other characteristics and advantages of the invention will emerge on reading the attached drawing, in which.

DETAILED DESCRIPTION

Figure 1:
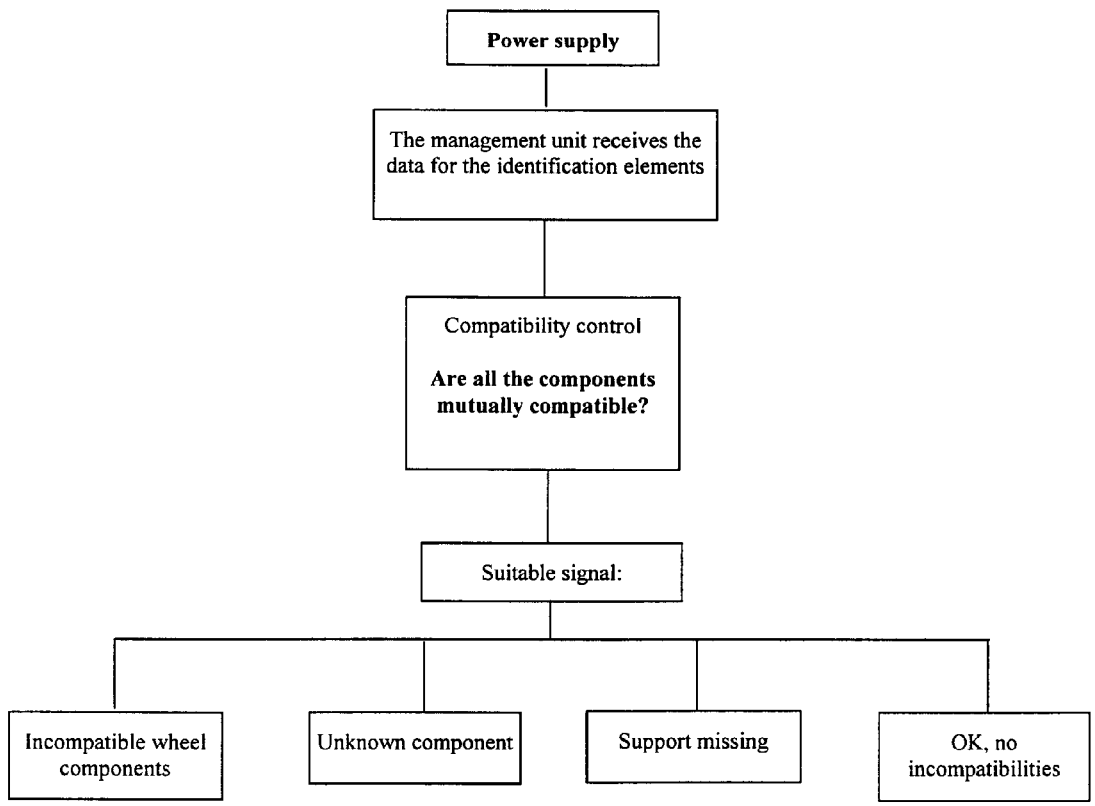
FIG. 1 is a flow diagram illustrating the main steps of the method according to the invention.

FIG. 1 shows a flow diagram representing the main steps of the verification method according to the invention. Power must be provided from the Power Supply to the management unit before a verification process is launched. It may be desired to carry out a compatibility verification several times, or regularly, for example after a predetermined time interval. Advantageously, a verification is carried out when the vehicle is started and before any movement, for example during checking of the various systems of the vehicle such as the engine immobilizer, airbags, lubrication circuit, etc. Thus, it may be avoided to start a vehicle on which service involving the wheels has recently been performed that involved a component that is incompatible with the others.

The verification process advantageously starts by sending data or codes to the management unit corresponding to the various components to be verified. The data or codes may correspond, for example, to standardized or characteristic dimensions of a component or alternatively to a more precise identification of the type of component or even to a serial number. The management unit must be designed to recognize these data and to process them as quickly as possible.

The management unit can then proceed to the compatibility verification step per se. It may then occur that the management unit does not recognize the data relating to one or more of the components. It is then possible to provide for the emission of a signal corresponding to this situation. The signal is then suitably processed, for example to produce a visual or audible warning, intended, for example, for the driver of the vehicle, who is then informed of the anomaly before taking to the road.

Advantageously, the verification method provides for the use of a compatibility table comprising data that is as complete as possible regarding the various arrangement combinations between the existing or known components. The data from the various manufacturers, with the types of components, the sizes, etc., and the acceptable arrangements, are preferably included. The acceptability may be well defined, that is to say by standardization, by notice from the manufacturers, etc. In such a case, comparing the data received with those in the compatibility table carries out the verification.

According to one advantageous variant, the codes or data assigned to each component may be used directly by the management unit to check the compatibility. For example, components corresponding to certain compatible sizes of rims, support, or insert may comprise common codes, common portions of codes, or codes for which it is relatively easy to make a correlation. In such a case, the management unit then directly compares the data or codes of the components with each other.

Once the compatibility verification has been carried out, the management unit, depending on the context, emits or does not emit one or more appropriate signals, for example: "certain components of an assembly are incompatible", or "unknown component", or "support missing", or "wheels OK". The signals are then appropriately processed, for example to produce a visual or audible warning intended, for example, for the driver of the vehicle, who is then informed of the anomaly before taking to the road.

Figure 2:
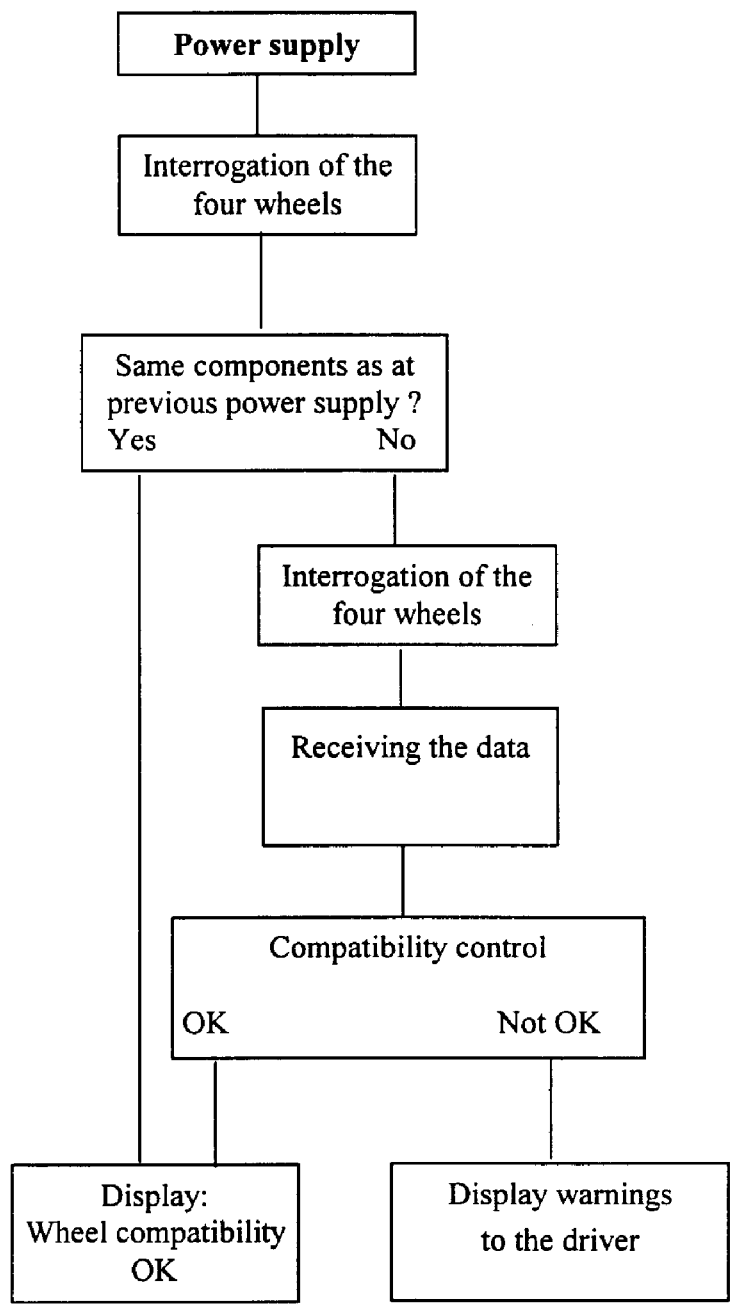
FIG. 2 is a flow diagram illustrating the main steps of a first variant of the method diagrammatically shown in FIG. 1.

In FIG. 2, the method is complemented by a pre-test consisting of checking whether the components of a given wheel are the same at one given time as at a preceding moment. For example, during a startup, it may be checked that the components are the same as at the previous startup. If such is the case, the compatibility test per se may advantageously be omitted, as illustrated in FIG. 2.

This figure is moreover representative of an advantageous embodiment using transponders as elements for identifying components. According to such an embodiment, to receive the data corresponding to the components, it is necessary to excite, stimulate, or feed the transponder to be able to reply, by sending the data. This is illustrated in FIG. 2 by the steps of data interrogation and reception. The interrogation member and the reception member may be combined as a single member. The compatibility verification may then be carried out, for example, as described for the case in FIG. 1. Various signals, such as those in FIG. 1, may also be emitted.

Figure 3:
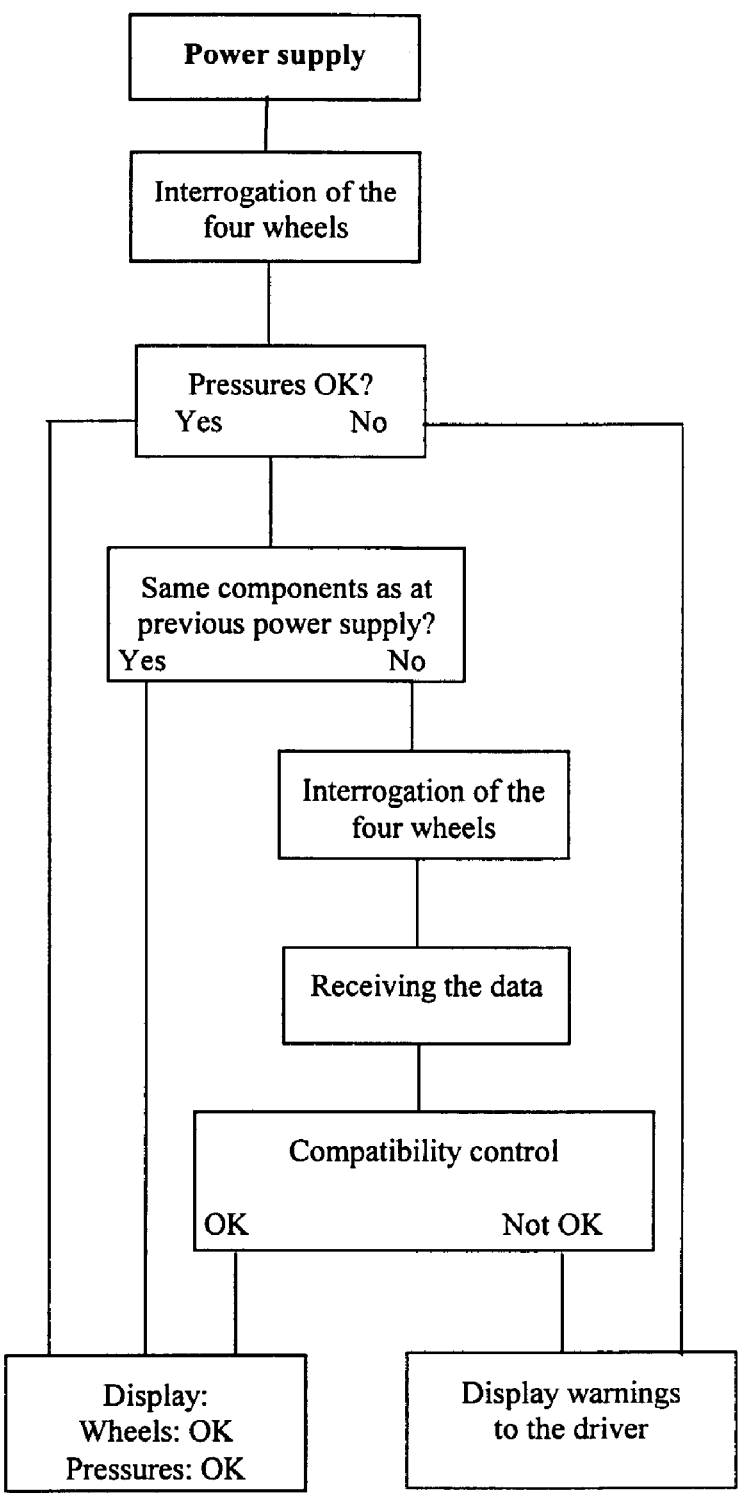
FIG. 3 is a flow diagram illustrating the main steps of a second variant of the method diagrammatically shown in FIG. 1.

FIG. 3 illustrates another variant of the method according to the invention, in which a pressure check is incorporated to obtain more complete information regarding the condition of the wheels and tires of the vehicle.

Figure 4:
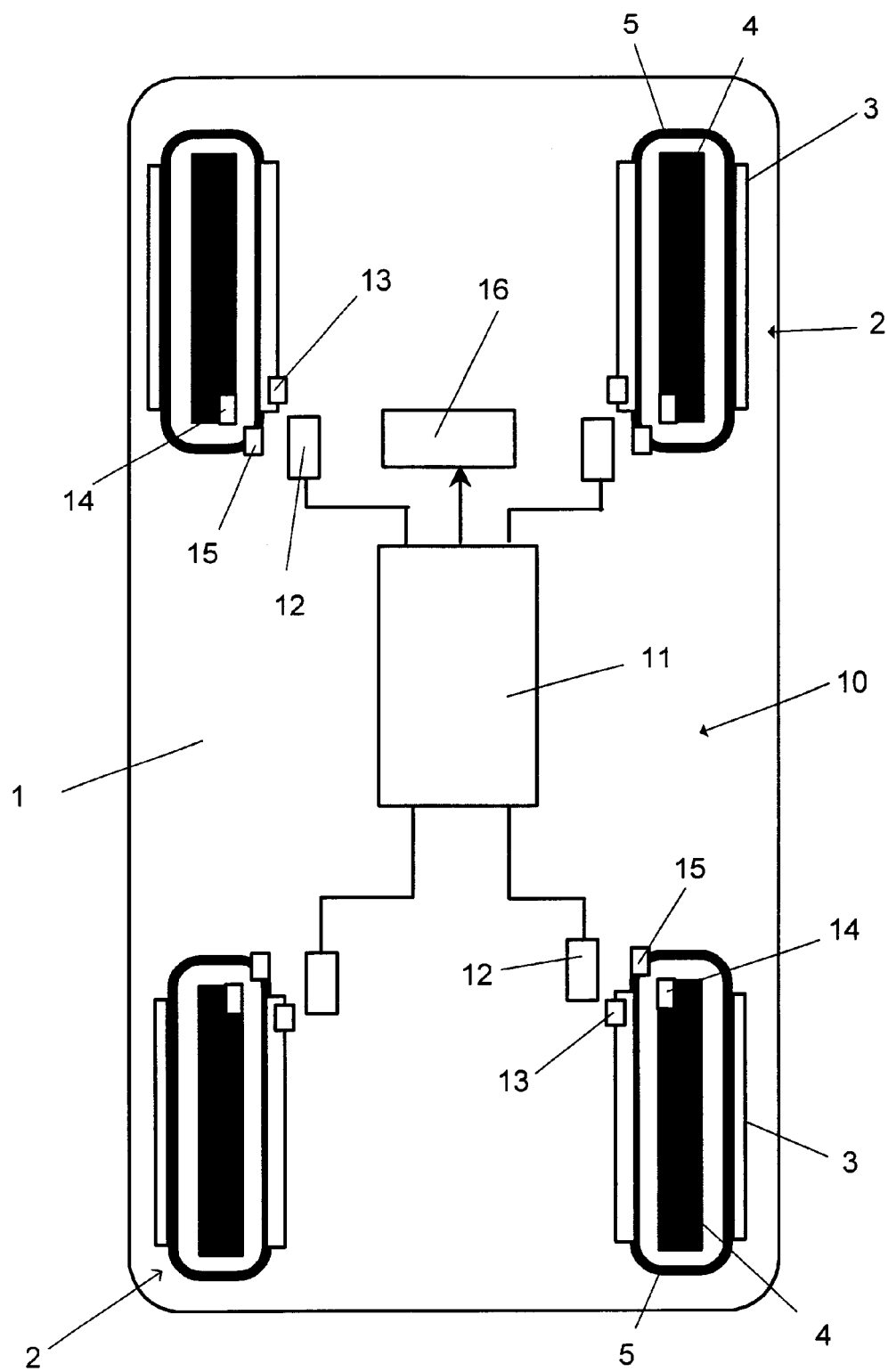
FIG. 4 illustrates a diagrammatic representation of a vehicle comprising a compatibility verification device according to the invention.

FIG. 4 shows a diagrammatic representation of a motor vehicle 1, comprising four mounted assemblies or wheels 2. These mounted assemblies are particularly suitable for allowing the temporary rolling of the vehicle during a partial or total drop in the pressure of one or more wheels. Thus, the mounted assemblies comprise a support 4, of known type, illustrated in FIG. 5 in transverse cross section in a mounted assembly in the position of rolling while flat. They also comprise a rim 3 and a tire 5.

Each of the components 3, 4, and 5 of each mounted assembly comprises an identification element, that is to say the identification element for the rim 13, the identification element for the support 14, and the identification element for the tire 15. These identification elements may be in a plurality of forms, for example, an electronic label such as a transponder, a memory element of ROM or RAM type, etc.

The vehicle 1 is equipped with a compatibility verification device 10 according to the invention. This device comprises at least one transmission member 12 such as, for example, an antenna with an excitation or interrogation circuit. These circuits allow data exchange with a transponder, for example. In such a case, to limit the excitation energy required to stimulate the transponder, it is advantageous to provide antennae arranged in the immediate vicinity of each of the mounted assemblies. It is also possible to use an arrangement of transmitters-receivers of radio type: a miniature transmitter is then placed on or integrated into each of the components and transmits the data to a single or a series of receivers, connected to a single or a series of antennae. The device also comprises a management unit 11. This may be a central processing unit, connected to the four wheels of the vehicle and performing the management of the information obtained from all the wheels, or alternatively local units, for example assigned to only one or two wheels. A display 16, for example of the audible or visual type such as a warning light, a message appearing on a screen, etc., linked to the management unit, allows the driver to be informed of the condition of the tires of his vehicle. According to one variant, the display may be backed up or replaced with a circuit-breaking system that prevents the vehicle from being started when an abnormal situation is detected. A compatibility verification device of similar type may also be provided outside the vehicle, for example for use by mechanics or even at the end of the vehicle manufacturer's assembly line.

Figure 5:
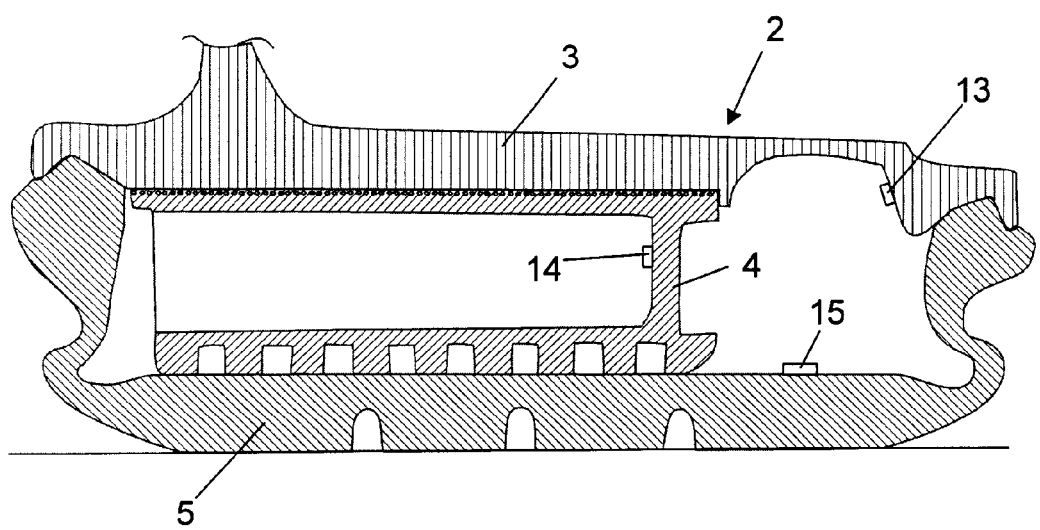
FIG. 5 is a view in transverse cross section of a mounted assembly comprising elements for identifying the components.

FIG. 5 illustrates a view in cross section of a mounted assembly in the position of rolling while flat. It shows an example of integration of the identification elements for the rim 13, the support 14, and the tire 15, which are arranged on a wall of the component and maintained, for example, by bonding. According to another example (not shown), these elements are integrated into one or other of the walls of the component under consideration.

According to one advantageous embodiment, the compatibility verification device comprises a system for transmitting data from the components to the central processing unit, based on transponder-type labels. Data transmission with technology of this type is well known per se. For example, patent application WO 97/45277 describes a wireless transmission system used, for example, to obtain information from a pressure sensor on the tire. However, this system is limited to the transmission of data of a given specific type.

According to the present invention, an evolved system is used to transmit not only information such as the pressure or the temperature, but also data regarding at least one of the components of the compatibility verification device described previously. Thus, according to one example of a specific architecture in which various data need to be transmitted (such as the identification elements for the rim, the support and the tire) or, alternatively, information regarding one or more physical parameters (such as pressure, temperature, etc.). A standard transponder is used for each of the components where only identification data are to be transmitted, or an evolved transponder for the component(s) where, in addition to the identification data, physical parameter data such as pressure need to be transmitted.

Such an arrangement might function with a frequency, for example, of 2.4 GHz, three transponders per mounted assembly, an antenna arranged in the immediate vicinity of the mounted assembly on the vehicle, and use three channels, that is to say one per transponder. A centralized management system then ensures the correct functioning of the system and ensures that any warning messages are sent, for example to the cockpit of the car. When it is operating, the management system can manage the interrogations, the data, and the warnings at the opportune moment.

Since such an arrangement comprises four antennae, distributed at the four corners of the vehicle, self-location is easy to achieve, by referring, for example, to the antenna used to transmit the data. If the location of this antenna is known, the mounted assembly concerned may be deduced from the data received.

Such an arrangement includes many advantages: it does not involve any major modification of the mounted assembly itself, the transponders used may be of autonomous type (battery-free); labels of similar technology are used for all the data to be transmitted; the labels may be interrogated at any moment on the vehicle and also on the tire mounting machine (the garage mechanic merely has to have available a management system and an antenna), etc.

What is claimed is:

1. A method for automatically verifying the compatibility of the components of an assembly comprising a rim, a tire capable of being mounted on the rim, said method having the following steps:

identifying each of the components of said assembly that it is desired to verify by means of automatically checkable identification elements;

mounting the assembly, and thereafter verifying at least two of these components by transmitting the corresponding identification elements to a data management unit;

checking the mutual compatibility of the components corresponding to the identification elements received by the management unit;

detecting any situation in which at least one of the components is incompatible with one or more of the other components;

generating a suitable signal in the event of an incompatibility.

2. The verification method according to claim 1, wherein the assembly also comprises a safety support intended at least partially to support the tread of the tire under conditions of reduced pressure.

3. The verification method according to claim 1, wherein the step of transmitting the identification elements corresponding to each of the components to a data management unit further comprises the sub-step of reading the data corresponding to each component.

4. The verification method according to claim 1, wherein the step of transmitting the identification elements corresponding to each of the components to a data management unit further comprises the sub-step of interrogating the data corresponding to each component.

5. The verification method according to claim 1, wherein step of transmitting the identification elements corresponding to each of the components to a data management unit is performed by transmitting the data by an active label.

6. The verification method according to claim 1, further comprising the step of emitting a suitable signal "OK" when all the compatibility conditions of the various components are satisfied.

7. The verification method according to claim 1, further comprising the step of emitting a suitable signal in the event of non-recognition of at least one of the components.

8. The verification method according to claim 1, wherein the step of checking compatibility is performed using a compatibility table.

9. The verification method according to claim 8, wherein said compatibility table comprises data for all the components to be arranged on the same assembly.

10. The verification method according to claim 1, further comprising the step of performing a simplified pre-test by comparing the components detected at a time T2 with those detected at a time T1.

11. The verification method according to claim 1, wherein said time T1 and said T2 correspond, respectively, to a first and a second powering up of the data management unit.

12. The verification method according to claim 1, wherein all of the components of all of the active wheels of the vehicle are verified.

13. The verification method according to claim 1, further comprising the step of measuring the pressure in the tire cavity.

14. A device for verifying the compatibility of the elements of an assembly comprising a rim and a tire capable of being mounted on the rim, said device comprising:
an identification element combined with each of the components of said assembly that it is desired to verify,
a transmission means, capable of allowing the transmission of data between each of the components of said assembly and a management unit, wherein
said management unit is capable of:
identifying a condition of incompatibility of at least one of the components of an assembly;
generating a signal corresponding to said condition of incompatibility.

15. The verification device according to claim 14, wherein said assembly further comprises a safety support intended at least partially to support the tread of the tire under conditions of reduced pressure.

16. The verification device according to claim 14, wherein each component comprises a label capable of containing the identification elements for that component.

17. The verification device according to claim 16, wherein said labels are of electronic and electronically checkable type.

18. The verification device according to claim 14, wherein said assembly further comprises a pressure detector capable of measuring the pressure inside the tire cavity.

19. The verification device according to claim 14, wherein the transmission means comprises an antenna.

20. The verification device according to claim 14, wherein the transmission means is of transponder type.

21. The verification device according to claim 14, wherein said transmission means is of radio transmitter/receiver type.

22. The verification device according to claim 14, wherein the assembly further comprises a display.

* * * * *